Feb. 7, 1928.
W. L. GAUTHIER
BRAKE
Filed April 28, 1926
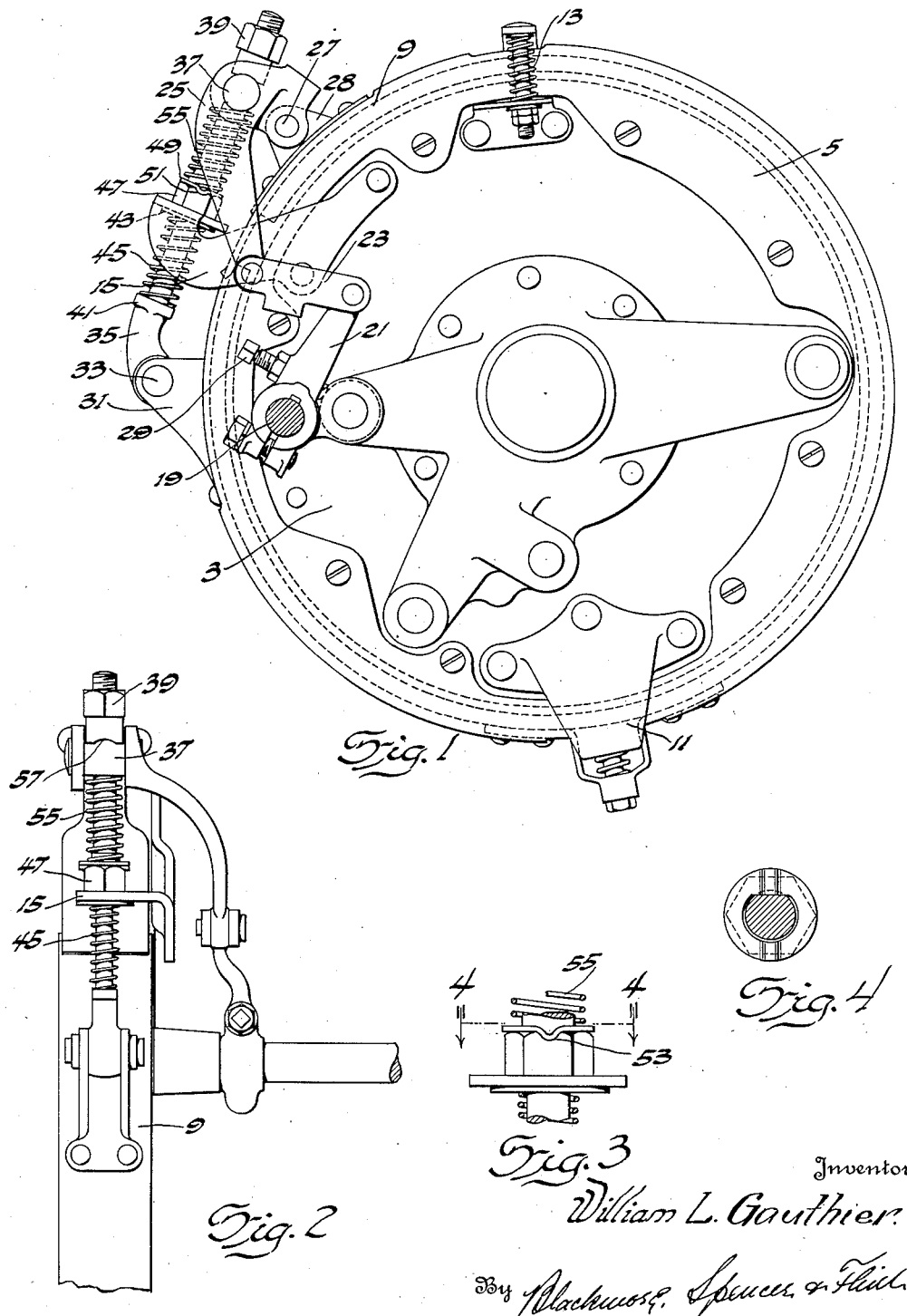
Inventor
William L. Gauthier.
By Blackmore, Spencer & Flint
Attorney Patented Feb. 7, 1928.

1,658,558

UNITED STATES PATENT OFFICE.

WILLIAM L. GAUTHIER, OF FLINT, MICHIGAN, ASSIGNOR TO GENERAL MOTORS CORPORATION, OF DETROIT, MICHIGAN, A CORPORATION OF DELAWARE.

BRAKE.

Application filed April 28, 1926. Serial No. 105,167.

This invention relates to brakes and is intended primarily for use on vehicles.

The brake is of the external band type, employing the usual brake anchor and the invention is concerned more particularly with the operating mechanism and the adjustments.

One object of the invention is to provide a novel operating mechanism by which the brake band is conveniently applied to the drum and by which the ends of the band are readily released.

A further object is to secure conveniently operable adjustments for such a brake.

With the above and other objects in view the invention will be understood from a reading of the following description in connection with the accompanying drawing.

In the drawing:

Figure 1 is a side elevation of a brake mechanism embodying my invention.

Figure 2 is an end elevation of the same.

Figure 3 illustrates in elevation a detail, and Figure 4 is a section on line 4—4 of Figure 3.

The invention is shown as applied to a rear wheel of a vehicle.

Referring by reference characters to the drawing, numeral 3 represents a plate which, together with a guard plate 5, covers the opening in a brake drum which is to be secured to the wheel. About this brake drum is located a brake band 9. The usual brake anchor is shown at 11 and at 13 is seen a spring which serves to hold the upper portion of the brake band off the drum. Secured to the plate 3 is a plate 15, which latter plate has its end extending transversely across the face of the drum between the ends of the band. Journalled in the cover plate 3 is a shaft 19. This shaft may be rotated by any convenient operating mechanism and is connected to the brake operating means for the application of the brake band to the drum. Shaft 19 has an arm 21 to which is pivoted a link 23. The link 23 is pivoted at its end to a lever 25. This lever is pivoted as at 27 to a lug 28 carried by one end of the brake band. For limiting the movement of arm 21, the arm is provided with a set screw 29 which may be engaged with a convenient abutment on plate 3, as shown in Figure 1.

The other end of the brake band is provided with a lug 31 to which is pivoted, as at 33, a link member 35. This link member passes through an opening in the plate 15 and also through an opening in the trunnion pin 37 carried by the lever 25. Threaded on the end of the link 35 is a nut 39 which engages the trunnion pin. The link 35 is provided with a shouldered portion 41 between which and washer 43, positioned against the plate 15, is a coil spring 45 exerting its pressure to push the lower part of the band away from the drum. To limit the action of the coil spring 45 there is a nut 47 which is threaded on the link 35 and engages the opposite side of the plate 15. Above this nut the link 35 is provided with a flat and slidably mounted upon the link is a washer member 49 correspondingly shaped to prevent its rotation about the link. The washer member has a projection 51 engaging a depression 53 on the nut. A spring 55 is located between the trunnion and the washer 49 and serves to hold the washer 49 and nut 47 in position, and to maintain a fixed distance between the nut and the trunnion pin. It will be observed that the nut 39 has a curved seat 57 which fits over the trunnion pin to prevent its turning.

The operation of the device will be readily understood. When the shaft 19 is rocked in a counter-clockwise direction the link 23 and the lever 25 press the upper end of the brake band against the drum and then move link 35 longitudinally to lift the nut 47 away from the plate 15, thus compressing spring 45 and pressing the lower part of the band against the drum. When the manual effort is released the lever 21 swings back to the brake releasing position and the spring 45 releases the brake, the nut 47 again engaging the abutment 15. Should it be desired to adjust the brake band on the drum the nut 47 is turned upon the threaded portion of the link 35. This will either draw the lower part of the band more snugly about the drum or, if turned upwardly toward the trunnion will enable the spring 45 to space the band further from the drum. In either movement the upper end of the link will be moved and thus change the position of lever 25. To restore this part to its former position, movement of nut 39 to compensate for the movement of nut 47 is required. It will be understood that the function of spring 55 is to prevent the nut 47 from movement on the link and also to maintain the definite spaced relationship between the trunnion pin and the nut 47.

A brake of this type may be employed upon either a front or rear wheel. When applied to a rear wheel the shaft 19 is to be placed in front of the rear axle. When used in connection with the front wheel the operating shaft is preferably placed above the front axle.

I claim:

1. A brake band operating mechanism including a drum, a band, a rigid abutment between the ends of the band, a spring between said abutment and one end of the band, a lever pivoted to the other end of the band, a link connected to the first end of the band and adjustably connected to the lever, a nut adjustably connected to said link to engage the abutment, a lock for said nut, and a spring between said nut lock and said lever, said nut lock and spring serving to prevent the rotation of the nut and to maintain the distance between the nut and the lever.

2. A brake drum, a band, a rigid abutment between the ends of the band, a lever pivoted to one end of the band and equipped with a trunnion pin, a link connected to the other end of the band and passing through the abutment and trunnion pin, an adjusting nut on the end of the link, an adjusting nut on the link engaging the abutment, a spring engaging the abutment to release the band, and means including a nut lock engaging said adjusting nut, a second spring between the nut lock and the trunnion, said nut lock with said spring serving to prevent the rotation of the nut and to maintain the distance between the trunnion and the nut.

In testimony whereof I affix my signature.

WILLIAM L. GAUTHIER.